VAPOR PRESSURE OF MIXTURE AT -78.9° C
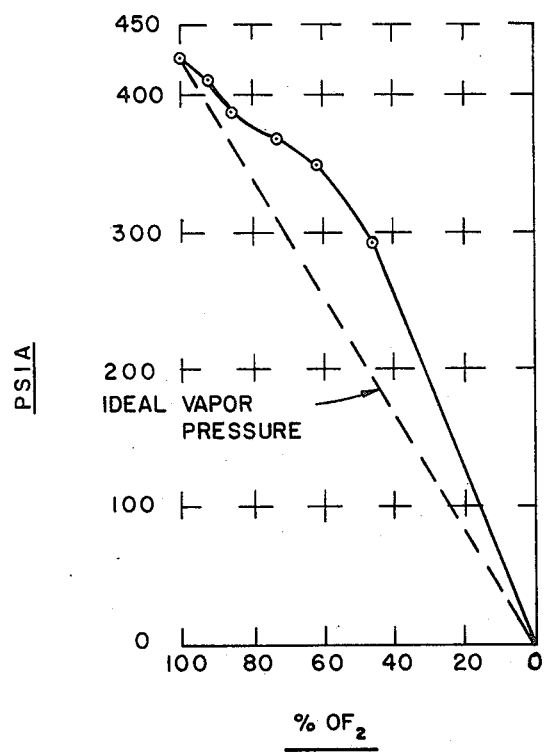

3,496,038
HIGH ENERGY LIQUID OXIDIZER
COMPRISING $ClF_5$ AND $OF_2$
Thomas A. Whatley, Santa Clara, Calif., assignor to United Aircraft Corporation, East Hartford, Conn., a corporation of Delaware
Filed Aug. 26, 1965, Ser. No. 483,391
Int. Cl. C09k 3/00; C06b 15/00
U.S. Cl. 149—1    2 Claims This invention relates to a novel composition of matter suitable for use as an oxidizer in rocket propulsion systems, and, more particularly, relates to solutions of oxygen difluoride ($OF_2$) and chlorine pentafluoride ($ClF_5$).

$OF_2$ is presently recognized as one of the most desirable high energy liquid oxidizers, both from the point of view of specific impulse, as well as storing and handling properties. However, since $OF_2$ is not hypergolic at low temperatures with most conventional fuels, an auxiliary ignition system must be used when $OF_2$ is an oxidizer, thereby increasing the weight of the rocket system. $OF_2$ also has a fairly high vapor pressure which limits its use to some extent in deep space missions requiring space storable oxidizers because it has a low but finite boil-off rate. Because of this undesirable characteristic, tetrafluorohydrazine ($N_2F_4$) has been considered as a suitable oxidizer for deep space missions, but this oxidizer has a history of instability. In attempting to improve the characteristics of $OF_2$, several additives have been considered. The interhalogen chlorine monofluoride (ClF) theoretically could be expected to be miscible with $OF_2$ because of the similarities in molecular weight, boiling points, and the lack of intermolecular forces between the like molecules. This has, in fact, been experimentally vertified. However, when attempts to increase the fluorine content of the additive have been made, for example, with chlorine trifluoride ($ClF_3$), theoretical analysis of the system indicates that $ClF_3$ and $OF_2$ would not be expected to exhibit much solubility or miscibility because of the dissimilarities in their molecular weights and their boiling points (boiling point of $OF_2$ is $-145°$ C. and the boiling point of $ClF_3$ is $+11°$ C.). Experimentally, there was no apparent solubility of $ClF_3$ in liquid $OF_2$. Because of the even greater differences in molecular weight between $ClF_5$ and $OF_2$, it was expected that even less solubility or miscibility of $OF_2$ and $ClF_5$ would be observed. However, contrary to the theoretical prediction, it was discovered that $ClF_5$ has some solubility in $OF_2$ even at $OF_2$ temperatures, and, further, that is is possible to form completely miscible systems of $OF_2$ and $ClF_5$. This unexpected discovery now makes it possible for a designer to combine the desirable features of both $OF_2$ and $ClF_5$. Since $OF_2$ is presently considered one of the best space storable oxidizers, and $ClF_5$ is considered one of the best earth storable oxidizers, the ability to obtain miscible solutions of both compounds greatly increases the designer's flexibility in choice of systems.

It is, accordingly, a primary object of this invention to provide a novel composition of matter, comprising a miscible system of $OF_2$ and $ClF_5$.

It is another object of this invention to provide a solution of $ClF_5$ and $OF_2$.

It is a further object of this invention to enhance the hypergolicity of $OF_2$.

It is another object of this invention to provide a means for enhancing the space storabiliy of $OF_2$.

These and other objects of the invention will be readily apparent from the following description with reference to the accompanying drawing which is a vapor pressure curve of the $OF_2/ClF_5$ system.

The curve of the figure was prepared by charging preselected mixtures of $OF_2$ and $ClF_5$ into a suitably pressurized container maintained at Dry Ice-acetone temperature of $-78.5°$ C., and at a pressure sufficient to keep the materials in liquid form; and the equilibrium vapor pressures of the resultant mixtures were determined by conventional means. A smooth curve without a plateau is obtained as indicated in the figure, and this is conclusive evidence that the two compounds are miscible in all proportions at this temperature. Further, since significant vapor pressure lowering results, this vapor pressure lowering has the effect of increasing the upper temperature storability of $OF_2$. Since presently estimated equilibrium conditions for deep space applications is between $-70°$ C. and $-50°$ C., the formation of a miscible solution of $OF_2$ and $ClF_5$ at or near these temperature ranges has great application therein. For example, the addition of approximately 10% of $ClF_5$ to the $OF_2$ produces a marked drop in the vapor pressure of the system, and, therefore, would greatly enhance the space storability of the oxidizer. Such a 10% solution of $ClF_5$ in $OF_2$ also will permit a hypergolic reaction with such conventional fuels as hydrazine or the light hydrocarbons, for example, thereby eliminating the need for a separate ignition system in deep space applications. The great advantage of the miscible systems of $ClF_5$ and $OF_2$ really lies in the high degree of flexibility that the designer now possesses. For example, if it is desired merely to enhance the hypergolicity of the $OF_2$, only the amount of $ClF_5$ necessary to provide hypergolicity with the specific fuel material need be added to the system; on the other hand, if it is desired to decrease the vapor pressure of the system, then the amount of $ClF_5$ necessary to bring the vapor pressure down to the desired level can be added. In between these two parametric extremes, any mixture of $OF_2$ and $ClF_5$ can be utilized to meet the particular design requirements of the system. It is noted that the solution of minute amounts of $ClF_5$ in $OF_2$ will enhance the hypergolicity of the mixture, and the minimum amount of $ClF_5$ necessary to insure hypergolicity depends, of course, on the particular fuel material being used. These values can be readily determined and are not critical to this invention. The important feature is that composition be in the form of a solution so that there is no phase separation of the $OF_2$ and $ClF_5$.

To establish solubility of $ClF_5$ in $OF_2$ at liquid $OF_2$ temperatures, $ClF_5$ was condensed in a glass tube and then frozen therein. $OF_2$ was then condensed onto the solid $ClF_5$ in amounts of approximately 84% by volume $OF_2$, 16% $ClF_5$. The mixture was agitated and gradually warmed. The interface between the $ClF_5$ and $OF_2$ was observed to recede, clearly, indicating that some solubility of $ClF_5$ in $OF_2$ was present even at temperatures of about $-145°$ C.

Although $ClF_5$ is slightly soluble in $OF_2$ at liquid $OF_2$ temperatures of approximately $-145°$ C., the system at that temperature does not appear to be completely miscible. Therefore, there is an intermediate temperature between the experimental temperature of $-78.5°$ C. used herein and $-145°$ C., below which the systems are not completely miscible. However, at temperatures above $-78.5°$ C., the systems will be completely miscible up to the critical temperature of the system above which the system can no longer remain in liquid form. Snice the critical temperature of $OF_2$ is about $-58°$ C., this miscibility of $ClF_5$ and $OF_2$ exists over a substantial temperature range. While this invention has been described with respect to specific embodiments theerof, this description is for purpose of illustration only, and should not be construed as limiting the invention. The invention is limited only by the following claims wherein:

I claim:

1. A novel composition of matter comprising a liquid phase solution of $ClF_5$ and $OF_2$.

2. A novel composition of matter consisting essentially of a liquid phase solution of $ClF_5$ and $OF_2$.

References Cited

Stacey et al., Advances in Fluorine Chemistry, vol. 4, 1965, pp. 213, 214, and 240.

LELAND A. SEBASTIAN, Primary Examiner

U.S. Cl. X.R.

252—186